Oct. 3, 1939.   C. S. McCARTHY   2,174,859
LEVER MECHANISM
Filed Feb. 11, 1938   2 Sheets-Sheet 1
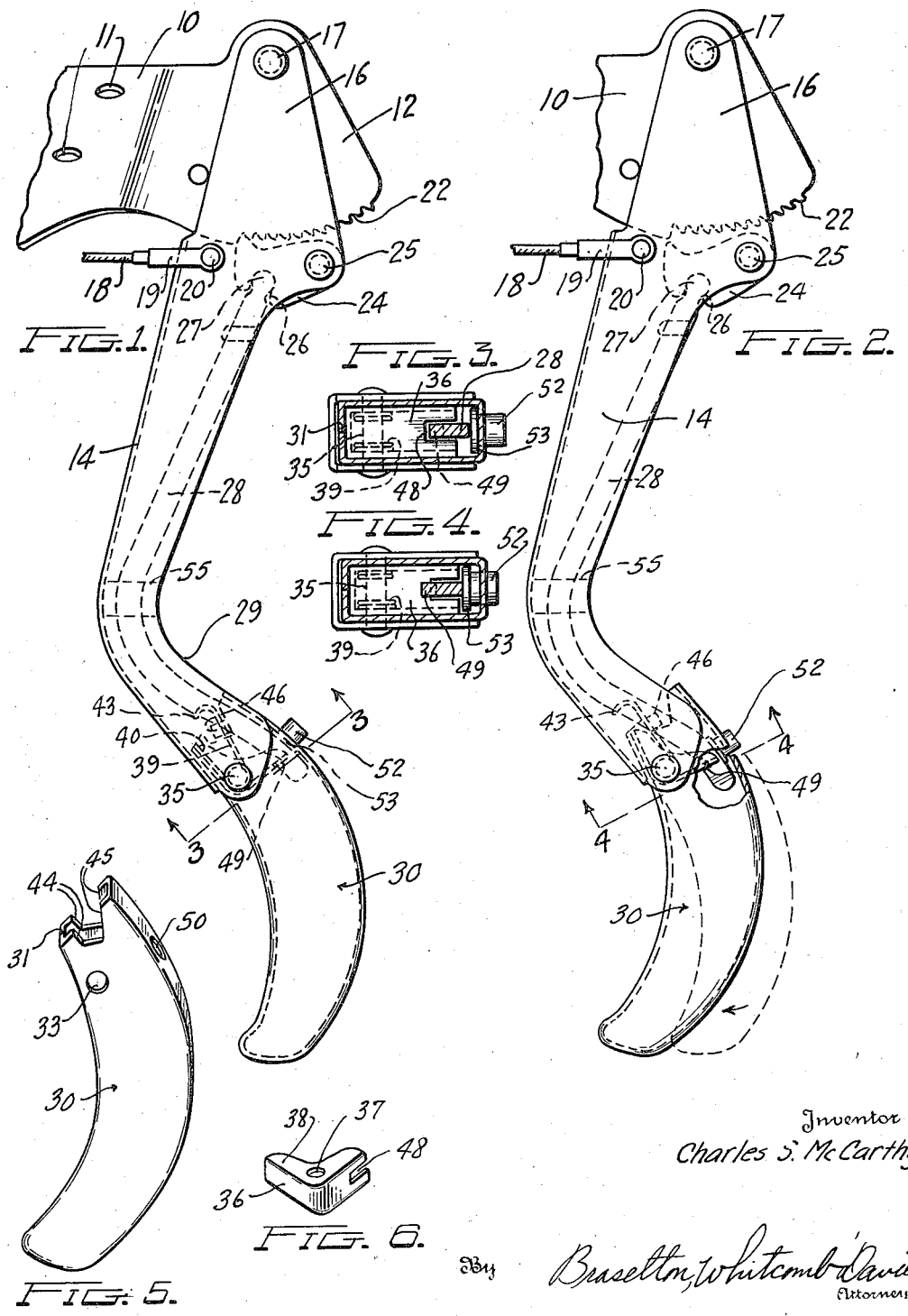
Inventor
Charles S. McCarthy
By Braselton, Whitcomb & Davies
Attorneys Oct. 3, 1939.   C. S. McCARTHY   2,174,859
LEVER MECHANISM
Filed Feb. 11, 1938   2 Sheets-Sheet 2
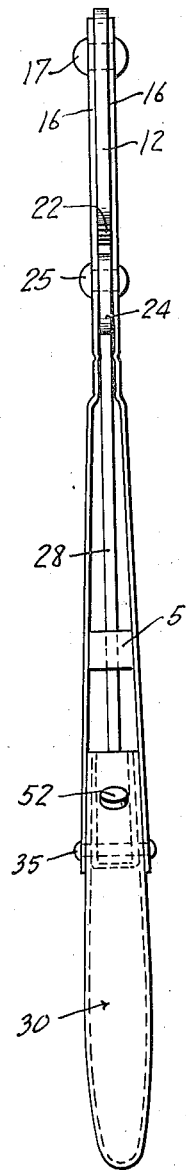
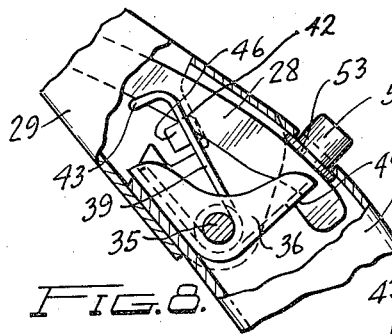
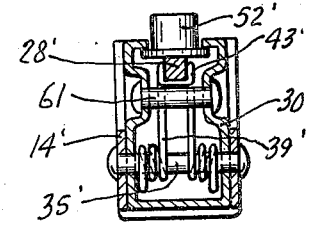
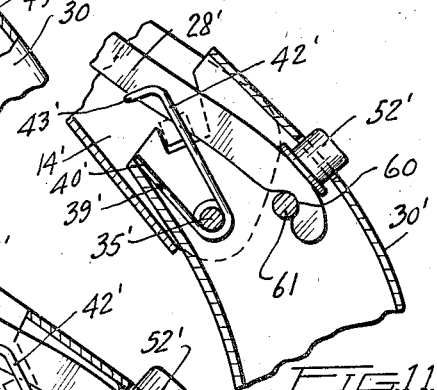
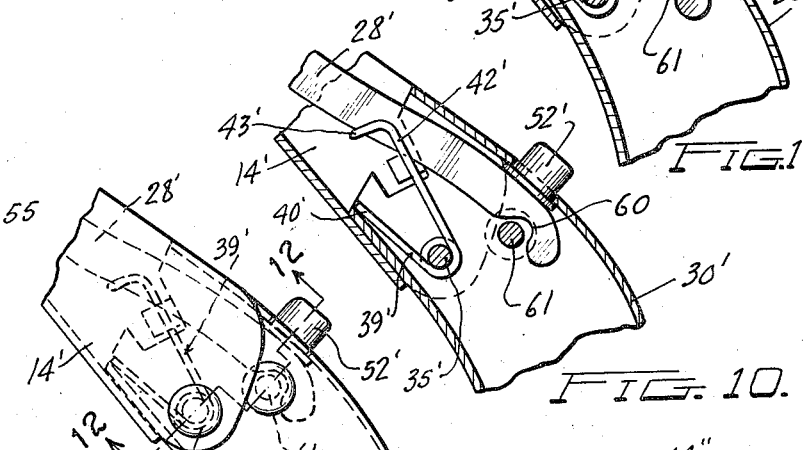
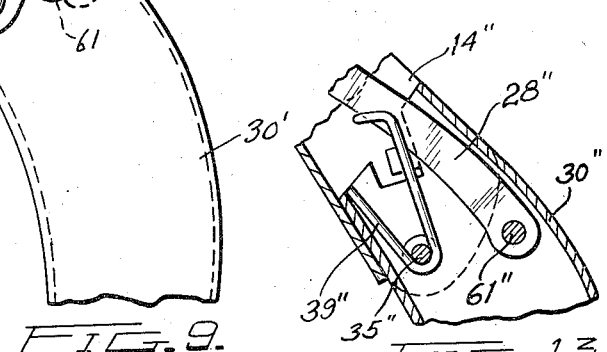
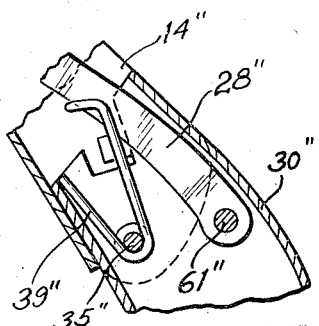
Inventor
Charles S. McCarthy
By Braselton, Whitcomb & Davies
Attorney Patented Oct. 3, 1939

2,174,859

UNITED STATES PATENT OFFICE 2,174,859

LEVER MECHANISM

Charles S. McCarthy, Toledo, Ohio, assignor to The Logan Gear Company, Toledo, Ohio, a corporation of Ohio Application February 11, 1938, Serial No. 190,064

8 Claims. (Cl. 74—536)

This invention relates to mechanism control arrangements and more particularly to lever constructions of the character especially adapted to control the brakes of an automotive vehicle.

The invention embraces the provision of a lever arrangement in which a clutch means is employed to hold the lever in adjusted position, the arrangement embodying a relatively movable element for effecting a release of the clutch means.

The invention comprehends the provision of a lever mechanism having a clutch arrangement for holding the lever in adjusted position coupled with a relatively movable element for actuating the clutch and incorporating a safety arrangement whereby actuation of an independent means is required to effect a release of the clutch mechanism through the movable element of the lever arrangement.

An object of the invention resides in the provision of a sheet metal lever arrangement wherein the operative elements of the clutch control therefor are contained within the lever.

Another object of the invention resides in the provision of a vehicle brake lever control mechanism incorporating a releasing means of a character which may not be inadvertently or accidentally released, thus assuring a positive safety control of the braking mechanism.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a side elevational view of lever mechanism of my invention;

Figure 2 is a view similar to Figure 1 showing the clutch and actuating means therefor in "released" position;

Figure 3 is a detail sectional view taken substantially on the line 3—3 of Figure 1;

Figure 4 is a transverse sectional view taken substantially on the line 4—4 of Figure 2;

Figure 5 is an isometric view of the handle or relatively movable portion of the lever arrangement of my invention;

Figure 6 is an isometric view showing one of the elements of the invention;

Figure 7 is a front elevational view of the lever shown in Figure 1;

Figure 8 is an enlarged detail view partly in section showing the connecting means between the movable portion of the lever and the clutch mechanism;

Figure 9 is a view of the lower portion of a lever mechanism showing a modified form of the invention;

Figure 10 is a sectional view similar to Figure 9 showing the arrangement of elements for establishing a connection between the movable portion of the lever and the clutch mechanism;

Figure 11 is a view similar to Figure 10 showing the connection in clutch operating position;

Figure 12 is a sectional view taken substantially on the line 12—12 of Figure 9;

Figure 13 is a fragmentary view showing a modified form of connection between a movable portion of the lever and the clutch mechanism.

While I have illustrated the lever arrangement as particularly adapted for operating the brakes of an automotive vehicle, it is to be understood that I contemplate the utilization of my invention with any structures where the same may be found to have utility.

Referring to the drawings in detail, there is illustrated a support or supporting member 10 having openings 11 to receive rivets (not shown) or other securing means for fastening the support to the cowl or dash portion of a vehicle, the lever arrangement of the present invention being particularly adapted to be mounted adjacent the instrument panel of the vehicle for convenience of manipulation by the operator. The support is preferably provided with a vertically arranged uniplanar portion 12 and the lever structure includes a body portion 14 formed of sheet metal of substantially U-shape or channel cross section, the upper portion terminating in spaced wall portions 16 adapted to straddle the uniplanar portion 12 of the support and are pivotally connected to the latter by means of a pin or rivet 17, the pivotal connection being the fulcrum of the lever which is of the second order of levers.

The braking mechanism of the vehicle (not shown) may be suitably connected to the lever body 14 by means of a cable 18 and a clevis 19 connected to the lever body by means of a pin 20 so that movement of the lever structure about its pivot or fulcrum 17 will actuate the braking mechanism through movement of the cable 18.

A depending edge of the uniplanar portion 12 presents a clutching surface 22, this surface in the embodiment illustrated being serrated or toothed although it may be of other configuration without departing from the spirit of the invention. The lever structure carries a clutch member adapted for cooperation with the clutching surface 22 in the embodiment illustrated, this clutching member being a pawl 24 pivotally connected by means of a pin or rivet 25 to the wall portions 16 of the lever, the pawl being interposed between the wall portions. The pawl 24 is provided with a partial circular slot having a restricted throat 26, the circular slot in the pawl being adapted to fit and accommodate a cylindrical portion 27 formed upon the upper end of a clutch actuating means or bar 28, the bar 28 being at all times in interlocked relationship with the pawl by means of the restricted throat 26 of the partial circular slot.

The bar 28 extends downwardly preferably within the confines of the lever body walls and is generally coextensive with the lever body. It is to be noted that the lever body is formed with its lower portion 29 bent rearwardly so as to permit the lever to be brought closely to the instrument panel, thus bringing the manipulating portion thereof to a more convenient position of the operator.

The lever structure of my invention is also provided at its lower extremity with a relatively movable portion or handle 30, the latter being preferably formed of sheet metal pressed or bent to a hollow configuration, the edges of the wall portions meeting in a seam or line as at 31 to form a substantially closed grip or handle. The handle portion may be made of moldable plastic or other suitable material if desired. In the embodiment illustrated the walls of the grip portion 30 are provided with openings 33 which register with openings in the side walls of portion 29 of the lever body as shown in Figures 1 and 2 and are pivotally connected together by means of a pin or rivet 35. It is to be noted that the upper part of portion 30 of the lever structure is telescoped within the portion 29 of the lever body. Also positioned within the hollow portion of the handle 30 is an L-shaped member or bracket 36 with aligned openings 37 through which the pin 35 extends. The pin 35 also serves to retain a hairpin-like spring 39 in position, the legs 40 of the spring projecting parallel with and within the confines of the side walls 38 of bracket 36 as illustrated in Figure 1, the intermediate portion 42 of the spring projecting laterally and having a loop 43 extending beneath the depending portion of the bar 28 serving at all times to urge the bar 28 to its position illustrated in Figure 1. It is to be noted that the upper end of the grip portion 30 is notched providing spaced pairs of opposed edge portions 44 and 45. There is also struck inwardly from both side walls of the portion 29 of the lever structure lugs 46 which cooperate with the edges 44 and 45 to limit the relative pivotal movement of the handle portion 30 of the lever structure with respect to the body portion of the lever.

The L-shaped bracket 36 has one wall provided with a slot or notch 48 and the lower portion of the bar 28 is also provided with a ledge 49 formed by recessing a portion of the bar, the bar normally being in the position as illustrated in Figure 3 so that the ledge 49 on the bar is not in operative contact with the L-shaped member 36 but is freely positioned in the slot 48. The forward wall of handle portion 30 of the lever structure is provided with an opening 50 within which is positioned a manipulating key member or button 52 which has a flange or shoulder 53 so that the outermost position of the button as illustrated in Figure 1 is determined by means of a shoulder 53. The key 52 rests directly against or is in contact with the bar 28, and as the loop 43 of spring 39 engages around bar 28 the latter is urged at all times in contact with the key 52 to hold the latter in its outermost position at the same time the spring urging the handle portion 30 to the position illustrated in Figure 1.

As clearly shown in Figures 1 and 3, the bar 28 is normally out of actual interlocking engagement with the L-shaped member 36, and that the handle portion 30 of the lever may be grasped by the vehicle operator and moved to the position indicated by dotted lines in Figure 1 or until the lugs 46 formed from the side walls of the portion 29 of the lever engage with the edges 44 of portion 30 to limit the relative oscillatory movement of the handle. This movement of the grip portion 30 does not, however, effect the movement of bar 28 or pawl 24 because there is no interconnection between the bar 28 and the L-shaped member 48 so that relative movement of the portion 30 without first depressing the key or button 52 will effect a release of the pawl or clutch 24.

Figure 2 shows the clutch in disengaged position with respect to the clutch surface 22, and in order to attain a release of the clutch, the button or key 52 must first be depressed before oscillatory movement is given or imparted to handle portion 30 of the lever in order to bring the ledge 49 of the bar 28 into interlocking engagement with the wall of the member 36 adjacent the slot 48 therein, all as particularly illustrated in Figure 4. After depression of the button 52 to bring the parts above mentioned into interlocking relationship an oscillatory movement of portion 30 in a clockwise direction as indicated in Figure 2 oscillates the L-shaped bracket 36 in a clockwise direction and draws downwardly the bar 28 and through the latter's interconnection with the pawl 24 thus moving the pawl out of engagement with the clutch surface 22. After this clutch disengaging operation has been completed and the parts moved to the position illustrated in Figure 2, the several portions of the lever will then move as an integral unit about the pivot or fulcrum 17 to effect a release of the braking mechanism.

From the foregoing description, it will be noted that inadvertent or accidental release of the brake mechanism by release of the lever is prevented unless a distinct independent movement of the key or button 52 is made prior to the oscillation of the portion 30 of the lever structure. This safety means becomes extremely important when it is considered that should the vehicle be parked in a "down hill" position an inadvertent release of the lever arrangement might result in a serious accident.

In some installations it may be desirable to dispense with a safety means and in such construction as is illustrated in Figure 13 the lower end of the bar 28" may be at all times operatively connected with the handle portion 30" of the lever by means of the rivet or pin 61" or other suitable operative connection, the handle portion 30" being pivoted to the lever body 14" by means of pin 35". In this form of the invention the spring 39" serves not only to keep the bar 28" in a position urging the clutch mechanism into operative engagement but also to maintain the handle structure 30" in the position as illustrated. It will be noted that any relative movement of handle portion 30" will move the bar 28" downwardly to withdraw the clutch from engagement with the clutching surface.

In order to maintain the bar 28 out of metallic contact with the lever structure as well as to dampen any noise which may arise by reason of vibration, I have provided a block or portion 55 of non-metallic material as, for example, sponge rubber or the like, which is positioned between the side walls of the lever, the block having a central opening through which passes the bar 28.

Figures 9 through 12 inclusive illustrate a modified form of means for establishing operative connection between the clutch means for retaining the lever in adjusted position and the movable handle portion 30'. In this form of the invention, the movable handle portion 30' is pivoted to the lower end of the lever member 14' by means of a rivet or pin 35'. The spring 39' has one portion 40' in direct engagement with the inner rear wall of the handle portion 30', while the intermediate portion 42' is looped about the bar 28' as at 43' similar to the arrangement hereinbefore described in connection with the form of the invention shown in Figures 1 and 2.

The lower extremity of the clutch actuating bar 28' is provided with a recess or notch 60 which is normally positioned adjacent a pin or rivet 61 which passes through aligned openings in the side walls of the handle portion 30' particularly as illustrated in Figure 12. There is also provided the manipulating means or button 52' for bringing the clutch connecting bar 28' into engagement with the rivet or pin 61 so that relative movement of the handle portion 30' with respect to the body portion 14' of the lever will actuate the clutch mechanism through movement of the bar 28'. Figure 10 illustrates the disengagement of recess 60 of bar 28' from the pin 61, and it will be obvious that relative movement of the handle portion 30' about the pivot 35' will not cause any movement of the bar 28'. However, when the button 52' is depressed as particularly shown in Figure 11, the recess 60 of bar 28' is brought into engagement with the pin 61 so that relative pivotal movement of handle member 30' about the pivot pin 35' causes a downward movement of the bar 28' and consequently disengages the clutch mechanism for holding the lever in adjusted position.

It is apparent that within the scope of the invention, modifications and different arrangements may be made other than is herein disclosed, and the present disclosure is illustrative merely, the invention comprehending all variations thereof.

What I claim is:

1. In combination, lever mechanism including a support; a lever member pivotally secured to the support; said lever member having a relatively movable handle portion pivotally secured thereto; said support having a clutching surface; a clutch member carried by said lever member and having cooperative relation with the clutching surface of said support; an element connected to said clutch member and coextensively arranged with said lever member and terminating adjacent the point of connection of the lever member with its relatively movable handle portion; and a member capable of independent relative movement with respect to the handle portion for establishing an interlocking connection between said element and the handle portion of said lever whereby relative movement of the latter is transmitted to said clutch member.

2. In combination, lever mechanism including a support; a lever member pivotally secured to the support; said lever member having a relatively movable portion pivotally secured thereto; said support having a clutching surface; a clutch member carried by said lever member and having cooperative relation with the clutching surface of said support; an element connected to said clutch member and coextensively arranged with said lever member and terminating adjacent the point of connection of the lever member with its relatively movable portion; spring means for normally urging said clutch member toward operative engagement with the clutching surface on said support; and a member capable of independent relative movement with respect to the relatively movable portion of said lever member for establishing an interlocking connection between the latter and said element whereby movement of the relatively movable portion is transmitted to said clutch member.

3. In combination, a support; a lever member pivotally connected to said support; said support having a clutching surface; said lever body having a relatively movable grip portion pivotally secured thereto; a clutch member cooperatively associated with the clutching surface of said support, a bar connected to said clutch member and terminating substantially adjacent the pivotal connection of the handle portion to the lever body; a bracket pivotally connected to the lever body; means for establishing an interlocking connection between said bar and said bracket whereby movement of the handle portion of said lever construction operates to withdraw the clutch member from engagement with the clutching surface.

4. In combination, a support; a lever member pivotally connected to said support, said support having a clutching surface; a handle portion; a clutch member cooperatively associated with the clutching surface of said support, said handle portion being pivotally secured to the lever body; a bar connected to said clutch member and terminating substantially adjacent the pivotal connection of the handle portion to the lever member; a bracket pivotally connected about the axis of the connection of the handle member to the lever member; a spring for normally urging said bracket and said bar into normal disengaged relationship; means for establishing an interlocking connection between said bar and said bracket whereby movement of the handle portion of said lever construction operates to withdraw the clutch member from engagement with the clutching surface.

5. A support; a lever body formed of sheet metal pivotally secured to said support; said support having a clutching surface formed thereon; a pawl member pivotally carried by said lever body and cooperatively associated with said clutching surface; a handle member; a pivot pin joining said handle member to said lever body whereby said handle member is capable of movement independent of said lever body; a bar connected to said pawl and extending to a point adjacent the pivotal connection of said handle member with the lever body; spring means acting on said bar for urging said pawl member into engagement with the clutching surface on said support, said bar and said handle member being arranged whereby an interlocking connection may be established therebetween; means for moving said bar relative to said lever body for establishing such interlocking connection whereby relative movement of the handle member with respect to the lever body releases said pawl from engagement with the clutching surface.

6. A support; a lever body formed of sheet metal pivotally secured to said support; said support having a clutching surface formed thereon; a pawl member pivotally carried by said lever body and cooperatively associated with said clutching surface; a handle member; a pivot pin joining said handle member to said lever body whereby said handle member is capable of movement independent of said lever body; a bar connected to said pawl and extending to a point adjacent the pivotal connection of said handle member with the lever body; spring means for urging said pawl member into engagement with the clutching surface on said support, said bar having a ledge formed thereon; means associated with said handle member for establishing an interlocking connection between said handle and the ledge on said bar; whereby relative movement of the handle member with respect to the lever body releases said pawl from engagement with the clutching surface.

7. A support; a lever body formed of sheet metal pivotally secured to said support; said support having a clutching surface formed thereon; a pawl member pivotally carried by said lever body and cooperatively associated with said clutching surface; a handle member; a pivot pin joining said handle member to said lever body whereby said handle member is capable of movement independent of said lever body; a bar connected to said pawl and extending to a point adjacent the pivotal connection of said handle member with the lever body; spring means for urging said pawl member into engagement with the clutching surface on said support, said bar having a recess formed therein; a pin carried by said handle member; and means for moving said bar to engage the recess in the bar with said pin for establishing an interlocking connection whereby relative movement of the handle member with respect to the lever body releases said pawl from engagement with the clutching surface.

8. In combination, a support; a lever arrangement pivotally connected to said support, said support having a clutching surface; said lever arrangement having a body portion and a relatively movable grip portion; a clutch member cooperatively associated with the clutching surface of said support, said handle portion being pivotally secured to the body portion of the lever member; manually operable interlocking means for establishing a connection between said clutch member and the handle portion of the lever arrangement whereby movement of the handle portion of said lever arrangement operates to withdraw the clutch member from engagement with the clutching surface, and spring means for normally urging the clutch member into engagement with the clutching surface.

CHARLES S. McCARTHY.